(12) United States Patent
Eriksson et al.

(10) Patent No.: US 9,794,959 B2
(45) Date of Patent: Oct. 17, 2017

(54) DYNAMIC RANDOM ACCESS RESOURCE SIZE CONFIGURATION AND SELECTION

(71) Applicant: Telefonaktiebolaget L M Ericsson (publ), Stockholm (SE)

(72) Inventors: Erik Eriksson, Linköping (SE); Robert Baldemair, Solna (SE); Johan Bergman, Stockholm (SE); Konstantinos Dimou, San Francisco, CA (US); Pål Frenger, Linköping (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 14/760,813

(22) PCT Filed: Jan. 17, 2013

(86) PCT No.: PCT/SE2013/050025
§ 371 (c)(1),
(2) Date: Jul. 14, 2015

(87) PCT Pub. No.: WO2014/112905
PCT Pub. Date: Jul. 24, 2014

(65) Prior Publication Data
US 2015/0373740 A1 Dec. 24, 2015

(51) Int. Cl.
*H04W 74/00* (2009.01)
*H04W 74/08* (2009.01)
(Continued)

(52) U.S. Cl.
CPC ........ *H04W 74/006* (2013.01); *H04B 17/309* (2015.01); *H04W 74/0833* (2013.01); *H04W 84/042* (2013.01)

(58) Field of Classification Search
CPC . H04W 74/0866; H04W 28/20; H04W 52/50; H04W 74/0833; H04W 74/08;
(Continued)

(56) References Cited

U.S. PATENT DOCUMENTS

| | | | |
|---|---|---|---|
| 2004/0156328 A1* | 8/2004 | Walton | H04B 7/0413 370/313 |
| 2010/0041428 A1* | 2/2010 | Chen | H04W 52/16 455/522 |

(Continued)

FOREIGN PATENT DOCUMENTS

| | | |
|---|---|---|
| EP | 2296423 A1 | 3/2011 |
| WO | 2007052971 A1 | 5/2007 |
| WO | 2012173565 A1 | 12/2012 |

OTHER PUBLICATIONS

3GPP, "3rd Generation Partnership Project; Technical Specification Group Radio Access Network; Evolved Universal Terrestrial Radio Access (E-UTRA); LTE coverage enhancements (Release 11)", 3GPP TR 36.824 V11.0.0, Jun. 2012, 1-18.

(Continued)

*Primary Examiner* — Jung-Jen Liu
(74) *Attorney, Agent, or Firm* — Murphy, Bilak & Homiller, PLLC

(57) ABSTRACT

The disclosure relates to connection setup between a wireless device and a mobile communication network using random access, and more specifically to dynamic random access resource configuration and selection. The disclosure provides for a method in a wireless device, of selecting random access resources for performing a random access procedure to a wireless network. The method comprises the step receiving information from a radio network node comprised in a cell of the wireless network, wherein the received information indicates at least a first and a second random access resource having different resource sizes. The method (Continued)

further comprises selecting one of said at least first and a second random access resources based on an expected uplink power received by the radio network node and transmitting a random access message to said wireless network using the selected resource. The disclosure further relates to methods for providing random access resources, as well as to a wireless device, and to radio network nodes of a wireless network.

18 Claims, 8 Drawing Sheets

(51) Int. Cl.
*H04B 17/309* (2015.01)
*H04W 84/04* (2009.01)

(58) Field of Classification Search
CPC . H04B 7/0697; H04B 7/0669; H04L 25/0224; H04L 1/0001; H04L 1/0059; H04L 25/0226; H04L 1/0071; H04L 25/03343; H04L 25/0242; H04L 27/2647; H04L 27/261
See application file for complete search history.

(56) References Cited

U.S. PATENT DOCUMENTS

| | | | |
|---|---|---|---|
| 2010/0054235 A1* | 3/2010 | Kwon | H04J 13/16 370/350 |
| 2010/0278137 A1* | 11/2010 | Kwon | H04J 13/0059 370/330 |
| 2011/0003560 A1* | 1/2011 | Futaki | H04W 52/24 455/67.16 |
| 2012/0033613 A1* | 2/2012 | Lin | H04W 74/085 370/328 |
| 2013/0083749 A1* | 4/2013 | Xu | H04W 74/0833 370/329 |

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.0.0, Dec. 2010, 1-53.

3GPP, "3rd Generation Partnership Project; Technical Specification Group Radio Access Network; Evolved Universal Terrestrial Radio Access (E-UTRA); Physical Channels and Modulation (Release 11)", 3GPP TS 36.211 V11.0.0, Sep. 2012, 1-106.

3GPP, "3rd Generation Partnership Project; Technical Specification Group Radio Access Network; Evolved Universal Terrestrial Radio Access (E-UTRA); Physical layer procedures (Release 10)", 3GPP TS 36.213 V10.6.0, Jun. 2012, 1-125.

3GPP, "3rd Generation Partnership Project; Technical Specification Group Radio Access Network; Evolved Universal Terrestrial Radio Access (E-UTRA); Radio Resource Control (RRC); Protocol specification (Release 10)", 3GPP Ts 36.331 V10.3.0, Sep. 2011, 1-296.

* cited by examiner

DYNAMIC RANDOM ACCESS RESOURCE SIZE CONFIGURATION AND SELECTION

TECHNICAL FIELD

The disclosure relates to connection setup between a wireless device and a mobile communication network using random access, and more specifically to dynamic random access resource size configuration and selection. The disclosure further relates to methods for dynamic random access resource configuration and selection, as well as to a wireless device, and to radio network nodes of a wireless network.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. The Universal Terrestrial Radio Access Network, UTRAN, is the radio access network of a UMTS and Evolved UTRAN, E-UTRAN, is the radio access network of an LTE system. In an UTRAN and an E-UTRAN, a User Equipment, UE, is wirelessly connected to a Radio Base Station, RBS, commonly referred to as a NodeB, NB, in UMTS, and as an evolved NodeB, eNodeB or eNodeB, in LTE. An RBS is a general term for a radio network node capable of transmitting radio signals to a UE and receiving signals transmitted by a UE.

A currently popular vision of the future development of the communication in cellular networks comprises large numbers of small autonomous devices, which typically transmit and receive only small amounts of data infrequently, for instance once per week to once per minute. These devices are generally assumed not to be associated with humans, but are rather sensors or actuators of different kinds, which communicate with application servers for the purpose of configuration of and data receipt from said autonomous devices within or outside the cellular network. Hence, this type of communication is often referred to as machine-to-machine, M2M, communication and the devices are denoted Machine Devices, MDs. The nomenclature used in 3GPP standardization for the communication is Machine Type Communication, MTC, whereas the devices are denoted MTC devices. As these devices are assumed to typically transmit rather seldom, their transmissions will in most cases be preceded by a Random Access, RA, procedure, which establishes the device's access to a network and reveals the device's identity to the network.

FIG. 1 schematically illustrates a cellular network 100 comprising a base station 110 and two wireless devices 120a, 120b, e.g. MTC devices. In a cell like the one disclosed in FIG. 1, wireless devices are located at different distances from the base station 110, wherein the channel characteristics vary due to different reasons e.g. distance to base station, disturbing radio sources or obstacles such as buildings.

An ongoing study item on low cost Machine Type Communication, MTC, in 3GPP Radio Access network, RAN 1 aims to enhance coverage with 20 dB coverage enhancements for low rate MTC devices. To achieve these coverage enhancements multiple channels will need to be improved. This disclosure aims at coverage enhancements in the random access procedure also referred to as RACH procedure. RACH stands for random access channel. A RACH is intrinsically a transport channel used by mobile phones and other wireless devices. However, the term RACH is often used as a general term referring to the random access procedure.

As an example, the random access procedure of a 3GPP Evolved Packet System, EPS, also known as a 3GPP Long Term Evolution/System Architecture Evolution, LTE/SAE, network is briefly described below.

In 3GPP Release 11, the Long Term Evolution, LTE, random access procedure is a four step procedure used for initial access when establishing a radio link, to re-establish a radio link after radio-link failure, to establish uplink synchronization or as a scheduling request if no dedicated scheduling-request resources have been configured on the Physical Uplink Control Channel, PUCCH.

3GPP Release 11 provides for a LTE random access procedure which is used in several situations: for initial access when establishing a radio link (moving from Radio Resource Control (RRC)_IDLE to RRC_CONNECTED state); to re-establish a radio link after radio-link failure; to establish uplink synchronization; or, as a scheduling request if no dedicated scheduling-request resources have been configured on the Physical Uplink Control Channel, PUCCH. The 3GPP Release 11 LTE random access procedure essentially comprises four basic steps which encompass a sequence of messages exchanged between the terminal and the eNodeB, as generally illustrated in FIG. 2. In FIG. 2, the four steps essentially correspond to the solid arrows, whereas the dotted arrows essentially correspond to control signaling for the solid arrow step which the dotted arrows precede. For example, the second step is the second arrow (dotted) and the third arrow (solid). The second arrow (dotted) tells the UE to listen to the third arrow corresponding to the second step. Further in the same way the fifth arrow tells the UE to listen to the fourth step in the RA-procedure corresponding to the last arrow. These basic four steps are briefly discussed below.

A first step in the random-access procedure comprises transmission of a random-access preamble on the Physical Random-Access Channel, PRACH. As part of the first step of the random-access procedure, the terminal randomly selects one preamble to transmit, out of one of the two subsets 301, 302 defined for contention-based access as illustrated in FIG. 3a. In LTE totally 64 preambles 300 are defined in each cell. Contention-based setup is used when there is a risk for collision of two UEs accessing the same resource. The subsets used for contention free setup 303 are used e.g. at handover, where there is no risk for collision.

Which subset to select the preamble from, is given by the amount of data the terminal would like to, and from a power perspective can, transmit on the Physical Uplink Shared Channel, PUSCH, in the third random access step. A time/frequency resource to be used for these transmissions is illustrated in FIG. 3b, which is understood by reading "4G-LTE/LTE Advanced for Mobile Broadband" by E. Dahlman et al, Academic Press, 2011. The time/frequency resource 310 to be used is given by the common PRACH configuration of the cell, which can be further limited by an optional, UE specific mask, which limits the available PRACH opportunities for the given UE. This is more thorough described in "3GPP TS 36.321 v.10.0.0. Medium Access Control (MAC) protocol specification" and "3GPP TS 36.331 v.10.3.0. Radio Resource Control (RRC) protocol specification".

A second step of the random access procedure comprises the Random Access Response. In the Random Access Response the eNodeB transmits a message on the Physical Downlink Shared Channel, PDSCH, containing the index of the random-access preamble sequences the network detected and for which the response is valid; the timing correction calculated by the random-access preamble receiver; a scheduling grant; as well as a temporary identify, TC-RNTI, used for further communication between the UE and network. A UE which does not receive any Random Access Response in response to its initial random-access preamble transmission of step 1 above within a pre-defined time window, will consider the attempt failed, and will repeat the random access pre-amble transmission, possibly with higher transmit power, up to a number of maximum of four times, before considering the entire random-access procedure failed.

The third step of the random access procedure serves, e.g., to assign a unique identity to the UE within the cell, C-RNTI. In this third step, the UE transmits the necessary information to the eNodeB using the PUSCH resources assigned to the UE in the Random Access Response.

The fourth and last step of the random-access procedure comprises a downlink message for contention resolution. The message of this fourth step is also known as the RRC Connection Setup message. Based on the contention resolution message each terminal receiving the downlink message will compare the identity in the message with identity transmitted in the third step. Only a terminal which observes a match between the identity received in the fourth step and the identity transmitted as part of the first step will declare the random access procedure successful, otherwise the terminal will need to restart the random access procedure.

The UE power to use in the random access attempt is calculated according to a specified formula, known from "3GPP TS 36.213 v.10.6.0. Physical layer procedures", reproduced as Expression 1 below, with parameters carried in the system information. If the UE does not receive a RandomAccessResponse in the second step of the procedure, the transmit power of the following PRACH transmission is increased by a parameter delta value up until limited by the UE maximum power:

$$PPRACH=\min\{P_{CMAX,c}(i), PREAMBLE\_RECEIVED\_TARGET\_POWER+PL_c\}\_[dBm]$$ Expression 1:

In Expression 1, $P_{CMAX,c}(i)$ is the configured UE transmitting power as defined in "3GPP TS 36.213 v.10.6.0. Physical layer procedures" for sub frame i of the primary cell and $PL_c$ is the downlink path loss estimate calculated in the UE for the primary cell.

As currently being discussed in 3GPP Coverage Enhancements TR 36.824, there are situations where a UE is unable to access the network due to Random Access Channel, RACH, coverage problems, e.g. the UE has Broadcast Control Channel, coverage and can thus measure on the cell and read the cell's system information, but the network cannot receive any random access preamble attempts from the UE because the UE is power/coverage limited, and hence the received signal in the network is too weak. This is the case, for example, for a user placed indoor served by a cell with high output power.

As an alternative starting from LTE Release 11, a UE can be configured to connect to multiple cells at once, i.e. one primary cell and one or several secondary cells and use so called carrier aggregation. In this case, the user equipment is also allowed to transmit RACH requests on the "secondary" cells, if the cells belong to different timing advance groups. However, if a device does not support carrier aggregation with multiple timing advance values random access is only allowed on the primary cell.

Hence, the above described random access procedure provides insufficient coverage. Repetition generally provides better coverage but provides limited opportunity for coherent combining and suffers from large power imbalances that affect orthogonality among sequences. Hence, power control such as applied for the LTE Release 8-10 formula has no benefits for users with significantly higher path loss than the path loss resulting in maximum power.

Hence, there is a need to provide a random access procedure which provides sufficient coverage and is suitable for low rate MTC devices.

SUMMARY

This disclosure provides a method for providing different random access opportunities in terms of multiple random access resource sizes and selecting random access resources for each wireless device/user equipment, based on the estimated received uplink channel quality. According to the disclosure users are divided between different random access resources dependent on expected uplink received power. In this way, random access requests received at each random access resource, will be received at network with similar power ensuring code orthogonality. Furthermore, the use of different resource lengths enables sufficient energy to be accumulated in the receiver, even when path loss is high. Additionally, the existence of different random access resource sizes will enable improved coverage. How this is achieved will be explained further below.

According to one aspect of the disclosure, it provides for a method in a wireless device, of selecting random access resources for performing a random access procedure to a wireless network. The method comprises the step receiving information from a radio network node comprised in a cell of the wireless network, wherein the received information indicates at least a first and a second random access resource being configured in the cell of said wireless network. The first and second random access resources configured in the cell have different resource sizes. The method further comprises selecting one of said at least first and a second random access resources based on an measured downlink channel characteristics or expected uplink power received by the radio network node and transmitting a random access message to said wireless network using the selected resource.

Hence, dynamic random access resource size selection is provided, wherein larger resource sizes are selected for lower expected UL power, wherein high path loss may be compensated by e.g. repetitions. Hence, the chance of a successful random access using few attempts is increased, as each wireless device will use a suitable resource size. Thus, the risk of collisions is decreased due to fewer repetitions.

Furthermore, the need for PRACH transmission power ramping as described above is minimized, due to the possibility of selecting different random access resource lengths. Hence, as an alternative to power ramping, resource ramping may be used. For example one could start with an estimated resource and if random access fails step up to a larger random access resource size and so on.

According to one aspect of the disclosure power control is applied with different power-control parameters for the first and the second random access resources. Thereby, similar received power levels for all random access requests on the same resource are maintained.

According to one aspect of the disclosure it relates to a computer program comprising computer program code which, when executed in a wireless device, causes the wireless device to execute the method of selecting random access resources.

According to another aspect of the disclosure it relates to a wireless device configured to select random access resources for performing a random access procedure to a wireless network, comprising a network communication unit, a processor and a memory. The network communication unit is configured to communicate with a network node in a cell of the wireless network. The memory stores computer program code which, when run in said processor, causes the wireless device to execute the method of selecting random access resources.

According to another aspect of the disclosure it relates to a method performed in a radio network node in a wireless network for configuration of random access resources for performing a random access procedure to said wireless network. The method comprises configuring, in a cell of said wireless network a first uplink radio resource as a first random access resource. The method further comprises, configuring in the same cell, at least one second uplink radio resource as a second random access resource, wherein said first and second uplink radio resources have different sizes.

Thereby, different random access opportunities are provided in the cell in terms of different resource sizes, suitable for devices with different expected uplink received power.

According to a further aspect of the disclosure it relates to indicating, to one or more wireless devices, the first and second random access resources. According to a further aspect of the disclosure rules applicable when selecting a random access resource to use by the wireless device are also indicated to the wireless devices.

The disclosure also relates to a radio network node in a cell of a wireless network configured to configure random access resources for random access to said wireless network. The radio network node comprises a processor, a memory and a radio communication unit. The memory stores a computer program code which, when run in the processor, causes the radio network node to execute the method for configuration of random access resources for performing a random access procedure to said wireless network.

With the above description in mind, the object of the present disclosure is to overcome at least some of the disadvantages of known technology as previously described.

BRIEF DESCRIPTION OF THE DRAWINGS

The present disclosure will be more readily understood through the study of the following detailed description of the embodiments/aspects together with the accompanying drawings, of which.

It should be added that the following description of the embodiments is for illustration purposes only and should not be interpreted as limiting the disclosure exclusively to these embodiments/aspects.

DETAILED DESCRIPTION

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

Embodiments of the present disclosure relate, in general, to the field of configuring random access resources, of different size duration in a LTE wireless network network. However, it must be understood that the same principle is applicable in other wireless networks for the purpose of configuring resources for random access.

In this application the term wireless device is generally used. A wireless device, or user equipment, UE, which is the term used in the 3GPP specifications, referred to in this application could be any wireless device capable of communicating with a wireless network. Examples of such devices are of course mobile phones, smartphones, laptops and Machine to Machine, M2M, devices etc. However, one must appreciate that capability to communicate with a wireless network could be built in almost any device e.g. a car, a lamp post, a scale and so on.

In an LTE system, an uplink resource block is a time-frequency resource consisting of resource elements in the form of 12 subcarriers of 15 kHz each in the frequency domain and a number of OFDM symbols, such as DFTS-OFDM symbols, of one slot of 0.5 ms size in the time domain, where two slots equals one sub frame of 1 ms. However, in a wider sense a Random Access preamble (such as one sent by the UE in the first message of the LTE Random Access procedure) can also be seen as a Random Access resource, enabling separation of signals using the same time-frequency resource.

Hence, resource size in this application refers to the time/frequency resource available for a random access transmission. The random access resource size is affected by transmission time and a frequency bandwidth, because if time duration or frequency bandwidth increases a higher data volume may be transmitted.

Embodiments of the present disclosure will be described more fully hereinafter with reference to the accompanying drawings, in which embodiments of the disclosure are shown. This disclosure may, however, be embodied in many different forms and should not be construed as limited to the embodiments set forth herein. Like reference signs refer to like elements throughout.

Figure 4:
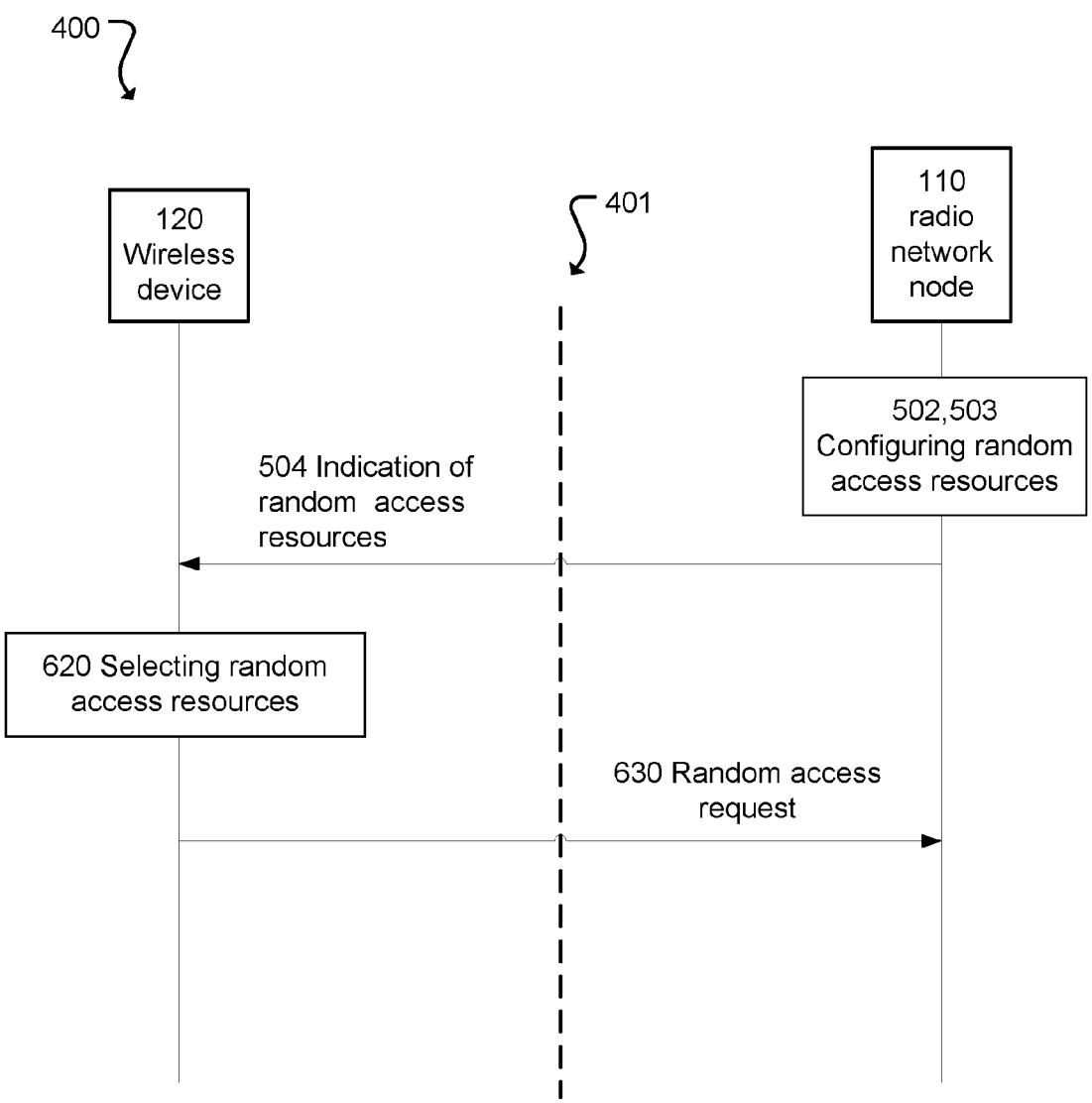
FIG. 4 illustrates an overview of the signaling in a system when performing random access resource configuration and selection according to an exemplary embodiment of the present disclosure.

FIG. 4 is a combined signaling diagram and flowchart showing an overview of the signaling in a system 400, comprising a wireless device 120 and network node 110, when performing the random access configuration and selection according to the technology disclosed herein. More specifically, FIG. 4 discloses an overview of the messages going between the wireless device 120 and the network node 110.

Figure 10:
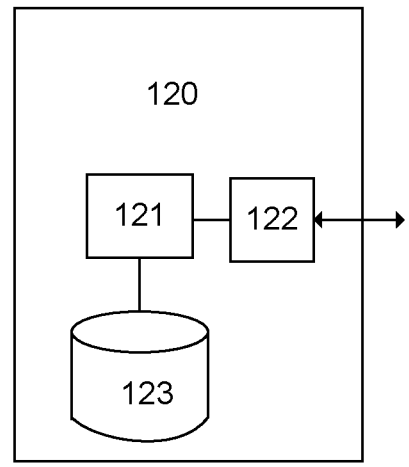
Figure 11:
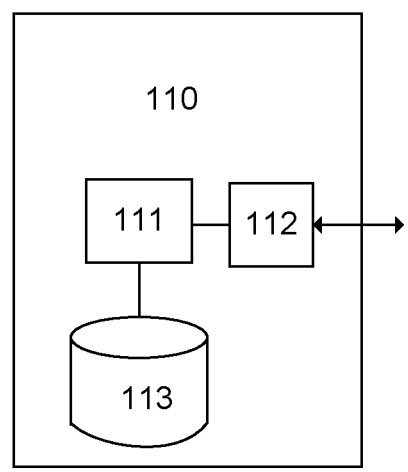

The radio network node 110, further described in FIG. 11, is e.g. a base station node, also simply known as "base station". The radio network node 110 comprises a communications interface 112 through which the network node 110 communicates on both uplink (UL) and downlink (DL) with the wireless device 120 over a radio or air interface 401. The radio or air interface 401 is illustrated by a dashed-dotted line in FIG. 4. In similar manner, the wireless device, further described in FIG. 10, also comprises a communications interface 122.

The transmission of random access requests, is generally restricted to certain allocated time and frequency resources. In LTE Release 11 communication systems, Physical Random Access, PRACH, resources can be configured in different ways dependent on e.g. cell size. Generally the guard and cyclic prefix, i.e. the "empty" period between the preamble transmissions, differ between the different PRACH formats and gives different alternatives depending on cell size. Some formats resend the same preamble two times subsequently.

Figure 7A:
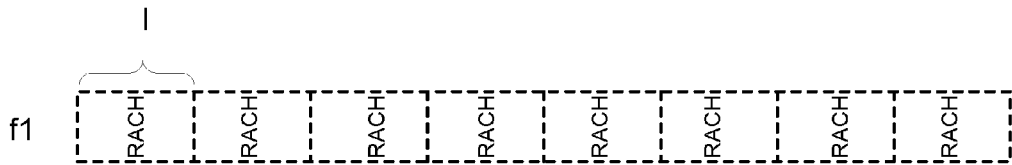
FIGS. 7a and 7b illustrates examples of RACH configurations of equal time duration.
Figure 7B:
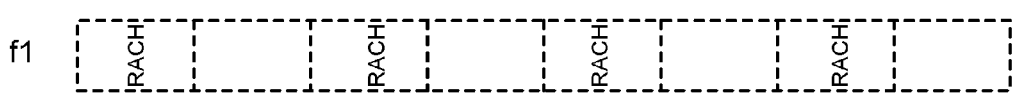

Hence, in present systems different configurations are used for different cells, see also 3GPP TS 36.211 V11.0.0 (2012-10)—section 5.7. A random access configuration specifies the time and frequency of allocated downlink resources. The configuration include all time slots on a certain frequency f1, or a selected number of frequencies on a carrier f1, see FIGS. 7a and 7b respectively disclosing two different random access configurations.

In the first step 502, 503 of the present disclosure, the radio network node 110 configures at least two different uplink radio network resources, of different sizes, for random access. This implies that at least two different random access opportunities are provided in the cell. The random access resources differ in terms of resource size.

A larger resource size is e.g. provided by a longer transmission duration, which is e.g. needed to compensate for the distance between the transmitting terminal and the base station. Hence, a far removed wireless device needs a longer transmission time.

Furthermore, for a wireless device with high propagation loss it is feasible with a random access resource with larger resource size, in terms of e.g. transmission length and/or frequency, increasing the total transmitted energy in the uplink in order to compensate for propagation loss. Thereby, the actual uplink received power will be higher than with transmission of legacy resource size.

In the next step 504, the resources for random access are indicated to the wireless device 120 e.g. in a broadcast message.

The wireless device then selects 610 an appropriate random access resource based on the received indication. For example, a wireless device with a low expected uplink received power selects a random access resource with larger resource size, in terms of e.g. transmission length or frequency, whereby the total received energy in the uplink will be increased in order to compensate for propagation loss.

Finally, the wireless device 120 uses the selected resource for performing a random access procedure, by transmitting 630 a random access request using the selected resource.

The methods for providing and selecting random access resources as well as the radio network node and the wireless device, will now be described in further detail.

Resource Configuration

Figure 5:
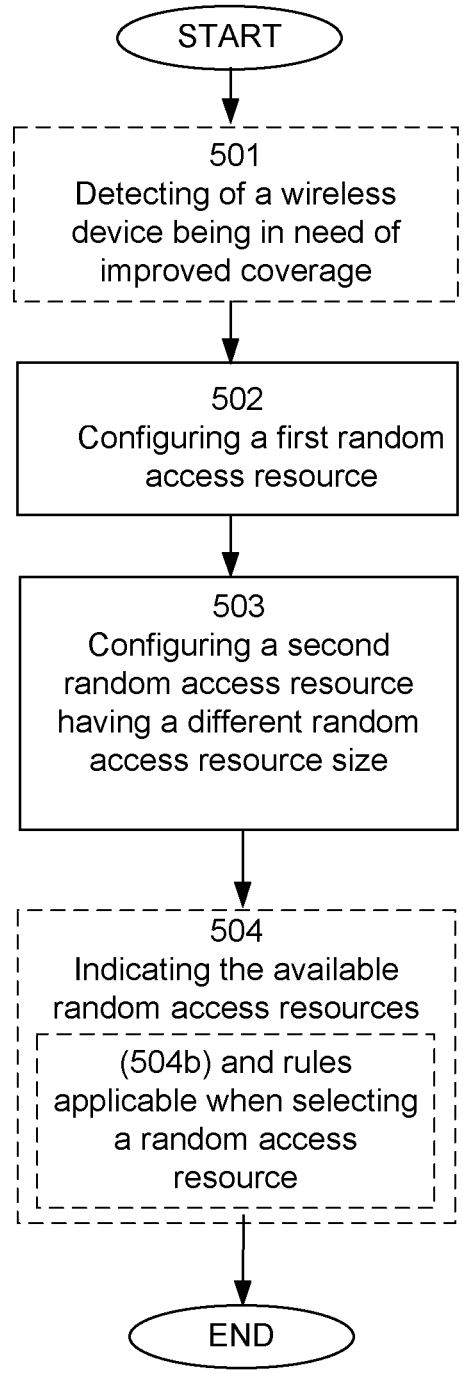
FIG. 5 is a flow chart illustrating a method performed by a network node according to an exemplary embodiment of the present disclosure.

As stated above, the transmission of random access requests is generally restricted to certain allocated time and frequency resources. According to one embodiment of the disclosure, it provides for a method performed in a radio network node 110 in a wireless network 100 for configuring random access resources for performing a random access procedure to a wireless network. The method implies that different random access radio resources, having different sizes, are provided in the same cell. This is accomplished by the method illustrated in FIG. 5 starting with a radio base station configuring 502 a first uplink radio resource as a first random access resource in a cell of a wireless network 100. Configuring implies that a certain physical resource is assigned for random access. When a resource is configured as a random access resource, the UE may transmit a random access request on said resource. Hence, the radio network node will receive and decode data transmitted on that resource as being a random access request. The random access configuration is typically sent to the wireless devices in broadcasted system information as described below.

As described above, a resource implies a physical radio resource defined by e.g. time and frequency. According to one aspect of the disclosure, a resource is further defined by a code sequence, such as the existing preamble constellation, a spreading code, a scrambling code or any other code enabling signal separation.

In the next step 503, at least one second uplink radio resource is configured as a second random access resource in the cell. A second resource implies that the node will be able to differentiate a signal transmitted using the first resource from a signal transmitted using the second resource.

The number of random access resources may of course be more than 2. According to one aspect of the disclosure it is e.g. be 3, 4, 5, 6 or more. According to one aspect of the disclosure several resources having the same resource size are provided as disclosed in the example described below in connection with FIG. 8.

Resource size is the amount of time/frequency resources, as explained above. Because the radio network node has configured random access channels of different size, different wireless devices in the cell may select to transmit random access requests, as described above, of different size.

However, larger bandwidth for random access transmissions might in some cases not be feasible due to maximum bandwidth limitation at the mobile device side. In addition, allocation of extra frequency bands for random access transmissions might be costly in terms of radio resources considering the reduced benefit due to the lower transmission power density this option implies. Hence, the embodiments in this disclosure are focused on longer transmission time. However, larger bandwidth is still an option.

As described below different resource size implies different transmission duration and/or different frequency bandwidth for said random access resources. In principle, by using a larger resource size, energy may be increased without power level adjustment. There are several ways of utilising the larger size. A simple way is to use repetition. Then, the same sequence e.g. a preamble sequence is sent several times and received data is accumulated at the base station transceiver. An alternative way would be to use coding schemes in order to increase chance of successful transmission.

If using a wider bandwidth the same preamble is transmitted at several frequencies. In the same way as when using increased transmission time the information is aggregated at the base station receiver. Hence, according to this disclosure, power limitation in the wireless devices may be compensated by longer transmission times used to increase the received uplink energy. Thus, a terminal having a high expected energy loss in the transmission path, e.g. because it is positioned close to the cell border 120*b*, uses larger random access resources than a wireless device 120*a* with low expected signal path loss.

Figure 8A:
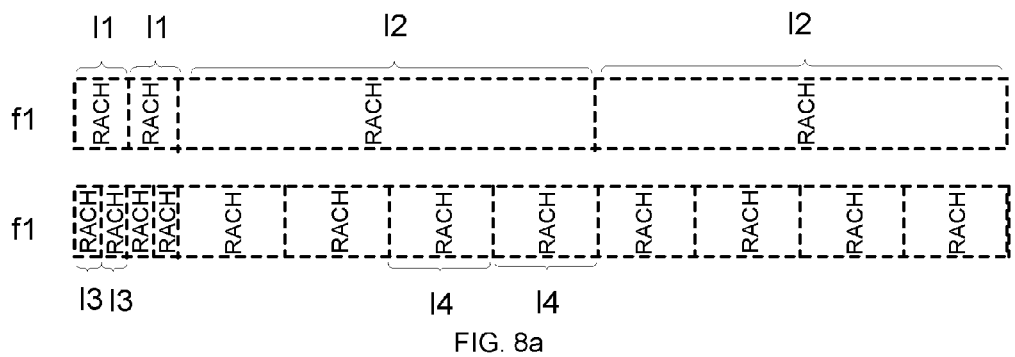
FIGS. 8a and 8b illustrates examples of RACH configurations of different time duration.
Figure 8B:
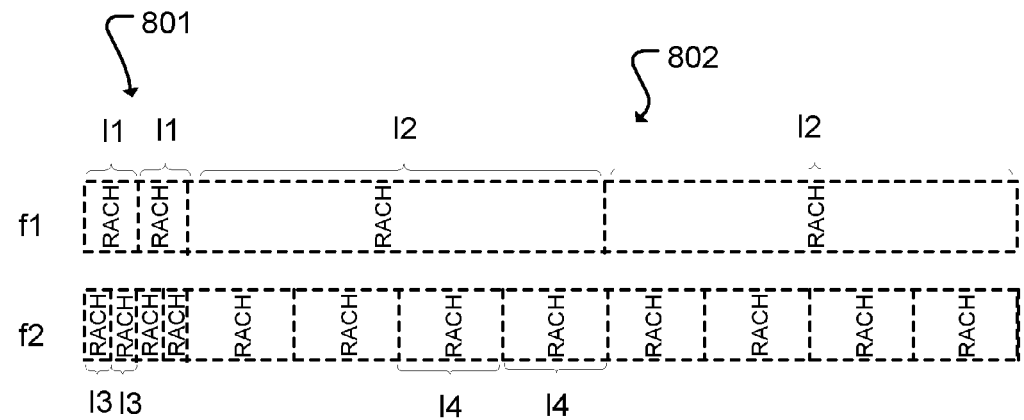

In one exemplary embodiment of the disclosure different random access resources occupy different resources in time and/or frequency as disclosed in FIG. 8*b*. In FIG. 8*b*, four different resource lengths l1-l4 are used. The first frequency f1 comprises two different lengths l1, l2 and the second frequency f2 comprises two other lengths l3, l4. There are several resources of each length available.

According to another embodiment, resources are separated in code domain by associating different sequences e.g. preambles, with different resource lengths. Hence, the first random access resource l1 and the second random access resource l3 use overlapping time/frequency resources. This implies that the first and the second random access resources partly utilises the same time and frequency. The first and the second random access resources are then separated in the code domain. Such a configuration is shown in FIG. 8*a*. In FIG. 8*a*, like in FIG. 8*b* four different random access sizes are used. However, in the example in 8*a*, the different resources use the same time and frequency, but are separated in the code domain.

Figure 3A:
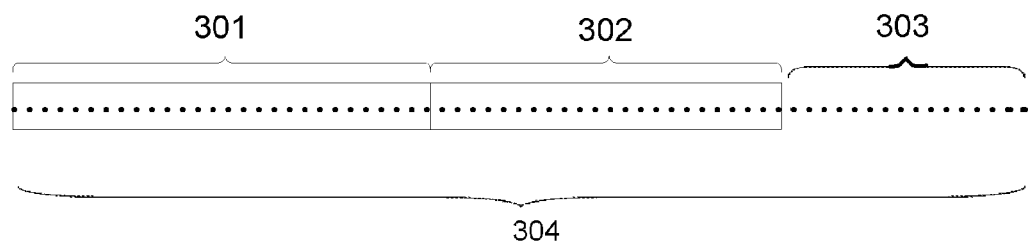
FIG. 3a illustrates two preamble subsets defined for contention-based access.
Figure 3B:
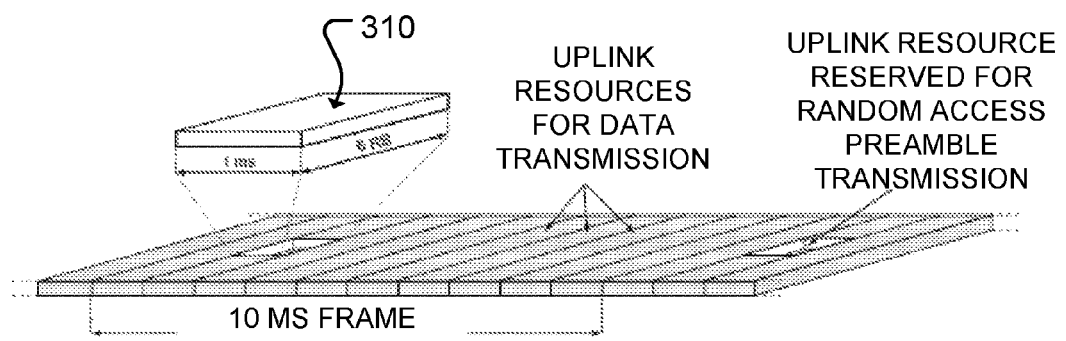
FIG. 3b is an illustration of random access preamble transmission in the time-frequency domain.

Code separation is e.g. implemented using different channel requests e.g. preamble sequences enabling code separation. Today, as described in connection with FIG. 3*a* above, the LTE standard defines different groups and subsets for different amount of resources requested. Code domain separation can be provided by specifying a new subset for devices with low expected uplink received power, wherein the preambles in the subset enables signal separation on code level.

In one embodiment of the disclosure the time/frequency resources for each random access resource size are configured separately. In other embodiments the time/frequency resources for one random access resource or random access resources are dependent on some other resource, e.g. one resource starting directly after a different resource or at the same time as the other resource but at an adjacent frequency.

A special case of this embodiment is where resources configured for random access are scheduled such that difference in resource size between random access resources that occupy the same time/frequency resources is minimised. Hence, random access resources of similar size, i.e. with small differences in size, occupy the same time/frequency resources while random access resources with larger size differences occupy different time/frequency resources, as disclosed in FIG. 8*a*. In the example in FIG. 8*a* this is achieved by letting resources of shorter lengths or time duration (as one example of resource size), l1 and l3 share time and frequency (to the left). Furthermore, resources of longer length or time duration l4 and l2 also share time and frequency (to the right).

By this method transmissions received with similar power will occupy the same time/frequency resources while time/frequency separation is achieved for large power differences. This embodiment builds on the assumption that smaller resource sizes are selected for wireless devices with higher expected uplink received power and vice versa. Signals partly received on the same time/frequency resources are separated in the code domain and therefore similar received power levels are important to ensure a good signal separation.

According to one aspect of the disclosure, it further comprises the step of indicating 504, to one or more wireless devices 120, the first and second random access resources. According to one aspect of the disclosure the indication is comprised in broadcasted system information.

In Release 8 of LTE time/frequency resources for random access, here referred to as "RACH resources", are indicated in the broadcasted system information. The term "RACH resources" here refers to both physical resources, i.e. frequencies and time slots, of the physical RACH, PRACH, as well as the preambles.

Resources for PRACH are indicated in the Information Elements, IE, rachConfigCommon and prach-Config, which are contained in the IE RadioResourceConfigCommonSIB as defined in 3GPP TS 36.331 v.10.3.0.

The last one, IE RadioResourceConfigCommon, is a part of the SystemInformationBlockType 2, SIB 2, broadcasted in the cell via Broadcast Control Channel, BCCH. This is the configuration in the system information. Similar configuration in the mobility control applies. More details can be found in 3GPP TS 36.331 v.10.3.0. Different Random Access, RACH, opportunities could be indicated in system information e.g. SystemInformationBlockType. Different or same amount of resources may be provided for different RACH resource sizes.

According to a further embodiment of the disclosure it further comprises indicating, to one or more wireless devices 120, rules applicable when selecting a random access resource to use by the wireless device 120. For example, the broadcasted system information comprises rules defining which random access resource a wireless device should use. The broadcasted information e.g. comprises information mapping each configured random access resource to an expected uplink received power interval.

Resource Selection

Based on the resource configuration the UE selects a RACH resource and/or a preamble as will now be described in further detail.

Figure 6:
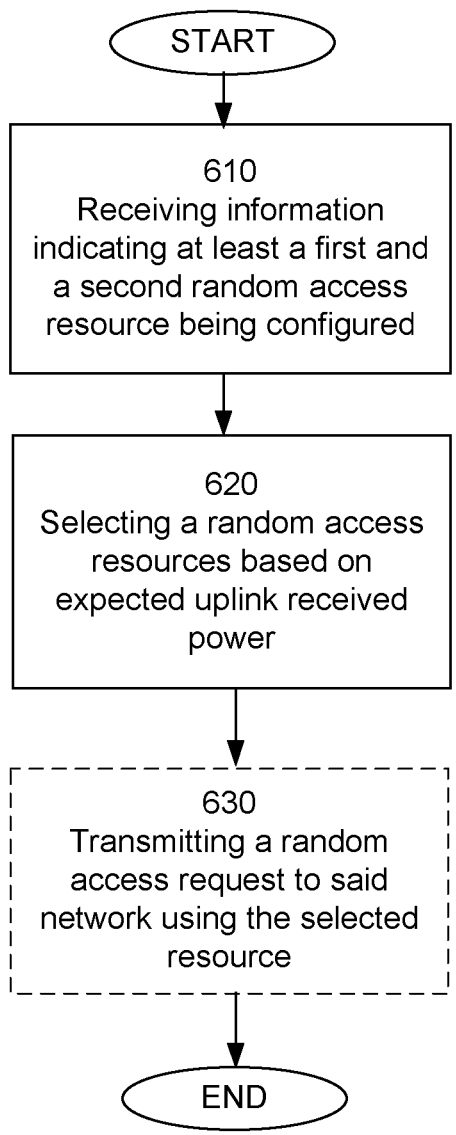
FIG. 6 is a flow chart illustrating a method performed by a wireless device according to an exemplary embodiment of the present disclosure.

In FIG. 6 the method performed in a wireless device of selecting random access resources for performing a random access procedure to a wireless network 100 is disclosed. In the first step the wireless device receives 610 information from a radio network node 110, comprised in the wireless network 100 indicating at least a first and a second random access resource available in a cell of the wireless network. This is e.g. in broadcasted system information as described in the previous section. As described above, the second random access resource has a different random access resource size in comparison with said first random access resource. Hence, as discussed above, this provides a possibility for a wireless device to select an appropriate resource length. The wireless device or the wireless network controls this selection, i.e. according to one aspect of the disclosure the wireless network sets the rules used for selecting the random access resource. A wireless device 120 is continuously required to obtain synchronization and to decode system information. In another exemplary embodiment the resource selection is based on time, either seconds or repetitions, the UE required to obtain synchronization or decode system information.

According to one aspect of the disclosure, the selection could be dependent on broadcasted system information parameters as described in previous section. According to one aspect of the disclosure, rules of selection are fixed in the standard e.g. 3GPP. Though, a general rule would be that smaller resource size is selected for a higher expected UL power. Similarly, a larger resource size is selected for a lower expected UL power.

In the next step 620, the wireless device selects one of the at least first and a second random access resources based on the expected uplink received power received by the radio network node 110 or measured downlink power. Expected uplink received power can be estimated by measuring downlink power control. However, it is not necessarily so that an implementation calculates the estimated received UL power. According to one aspect of the disclosure the terminal bases its selection directly on measured downlink power.

According to one aspect of the disclosure it is the expected uplink received power of the corresponding physical random access channel. The expected uplink received power may be calculated in several ways as will be further described below. In the next step, the wireless device transmits 630 a random access message to the network using the selected resource. The expected uplink received power may e.g. be the expected received power of random access messages, in LTE typically preambles, sent by the wireless device when performing a random access procedure.

In one exemplary embodiment the resource selection is based on downlink channel measurements. In principle the downlink channel measurements is an estimation of expected uplink received power. The resource selection is according to one aspect of the disclosure based on a measured downlink power and an offset. The offset is e.g. an expected difference in transmit power and receiver performance between the uplink and the downlink. The offset may be indicated to the wireless device by the network node.

Hence, the expected uplink received power is derived from downlink channel characteristics. It is then assumed that the channel characteristics are similar in uplink and downlink. For example the wireless device estimated downlink received power and/or SINR map to different resources.

As an example a resource selection formula is formulated like select shortest RACH duration satisfying:

$$10 \log(\Delta_{RACH}) + P_{c,max} - PL_c > \text{PREAMBLE\_RECEIVED\_TARGET\_ENERGY}$$

Where $\Delta_{RACH}$ is the time duration of the RACH resource, $P_{CMAX}$ is the configured UE maximum transmit power of the serving cell c and $PL_c$ is the downlink path loss estimate calculated in the UE for serving cell c. PREAMBLE_RECEIVED_TARGET_ENERGY is either fixed e.g. given in specification, or signalled from higher layers.

In another exemplary embodiment the resource selection is based on number of or duration of previous attempts to access said cell.

Regarding the RACH configuration selection, as also mentioned above in the same paragraph, for the normal operation of RACH the target is that all preambles within a given RACH resource are received with similar power level.

However, since these coverage enhancement features e.g. target static sensors reporting measurements to the network, then, in the course of time, the network or wireless device can learn the amount of repetitions, i.e. the time duration, needed in the configured RACH.

As an example, consider the case that a given sensor, now referred to as a wireless device, is located at a position where 20 RACH repetitions are needed for the correct reception of the RACH preamble. This specific wireless device gets the RACH configuration 801 of length l1 of FIG. 8b. This user is competing for access to the system with other wireless devices experiencing similar radio conditions as this wireless device in discussion here, because wireless devices with similar radio conditions will eventually be mapped to the same resources.

Consider another second wireless device located in another location, where 100 RACH repetitions are needed. This second wireless device is allocated the last RACH configuration 802, of length l2, at the right end of FIG. 8b, because due to its poor radio link a long random access transmission time is favourable in order to avoid repetitions.

Resource selection according to one embodiment of the disclosure will now be described in connection to FIG. 9. In this example, the second wireless device mentioned above, in need of coverage enhancement feature contacts the wireless network 100 for the first time. The wireless device 120 receives 610 a RACH configuration from a radio network node 110, without knowing which coverage enhancement RACH configuration, i.e. the time duration of the RACH configuration, to use. The wireless device initiates the RACH procedure 611 and detects that this is a first random access attempt 612.

The wireless device 120 then selects 620 an initial RACH configuration. This is e.g. done by estimating the amount of RACH repetitions, i.e. RACH duration, needed approximately so as to meet the target. As an alternative, this estimation is based on the received signal strength, the amount of repetitions needed so as to receive PSS/SSS, PDCH and BCCH, or a combination of them. In case such estimation is not possible, or, in case it is estimated to be unreliable, then the wireless device 120 might choose, or might be dictated by the wireless network 100, to choose e.g. the second longest RACH duration, l4.

The wireless device then tries this configuration 630 a number of times N. The wireless device 631 then checks if a successful attempt has been performed within N attempts. In case, the wireless device 120 does not get access to the system after these N attempts, 1 attempt corresponds to the four steps described in §4.1), then, the wireless device tries the next (in terms of size) RACH configuration 635, until the wireless device is granted access within this number N of chances. Hence, the wireless device steps up the RACH resource size, until it is granted access. When successful grant is achieved within N attempts the random access resource length is stored 640 for future use.

Figure 9:
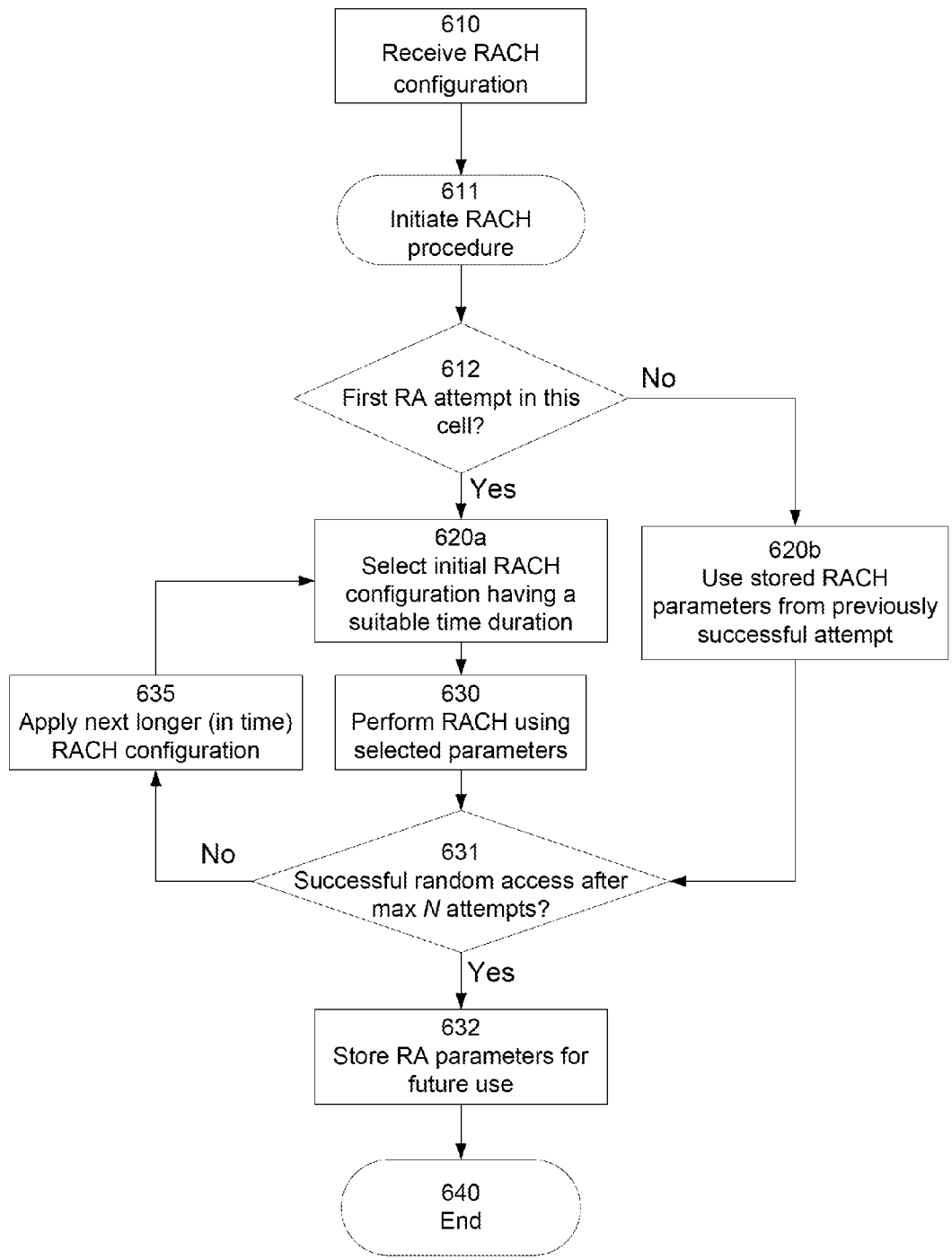
FIG. 9 is a flowchart illustrating time controlled RACH configuration selection during the initial random access attempt at the wireless device according to an exemplary embodiment of the present disclosure.

FIG. 9 illustrates the method for selecting RACH configuration during the very first random access attempt. According to one aspect of this embodiment, in case the RACH configuration with the longest duration has been tested N times and still the wireless device haven't been granted access to the wireless network 100; the longest RACH duration is selected.

According to another aspect of the invention the wireless device starts with the longest resource size and then decreases size dependant on the number of repetitions or size needed.

During this procedure of RACH repetition, the network might give feedback by indicating the number of RACH repetitions which resulted in successful random access. The next time the method is performed, the wireless device 100 will identify 612 that it is not the first random access attempt in this cell. Then the wireless device will use 620b stored RACH parameters for the first attempt.

The RACH configuration selection performed according to the method described above and illustrated at FIG. 9 is a method in which the approach taken is to minimize the risk that a given wireless device in need of coverage enhancement features is received at the base station with signal level much higher than that of others. This may be viewed as a conservative approach which might take time to reach to the correct choice of RACH configuration for wireless devices in need of very significant coverage enhancements.

The alternative to this one approach would be to start with the longest possible RACH configuration if an initial random access attempt is identified in step 620a and by getting feedback from the network on the amount of RACH repetitions, i.e. RACH configuration, which resulted in successful random access.

This procedure is in most cases faster than the one described in FIG. 9. It entails the case in which the transmission from this wireless device generates unnecessary collisions during the learning period. Consider for example the case in which a given wireless device makes use of this procedure and applies 100 RACH repetitions. This same wireless device might need only 20 repetitions. Hence, after 20 RACH repetitions, the network feeds back information that only 20 RACH repetitions were needed.

In an alternative embodiment power control is applied with different power-control parameters for different random access resources. Such power control can be used to maintain similar received power levels for all preambles transmitted on the same resource.

According to one aspect of this embodiment, a specific resource will be used by users having a path-loss within a defined range. A power control scheme could for example target, that the user with the largest path loss in this range use full power and user with better channel than this compensate this by reduced power such that all preambles on a specific resource size are received with the same power.

In an alternative embodiment of the disclosure the estimated coherence time of the downlink channel is also considered in the preamble and/or resource selection for the random access.

Response Messages

Figure 1:
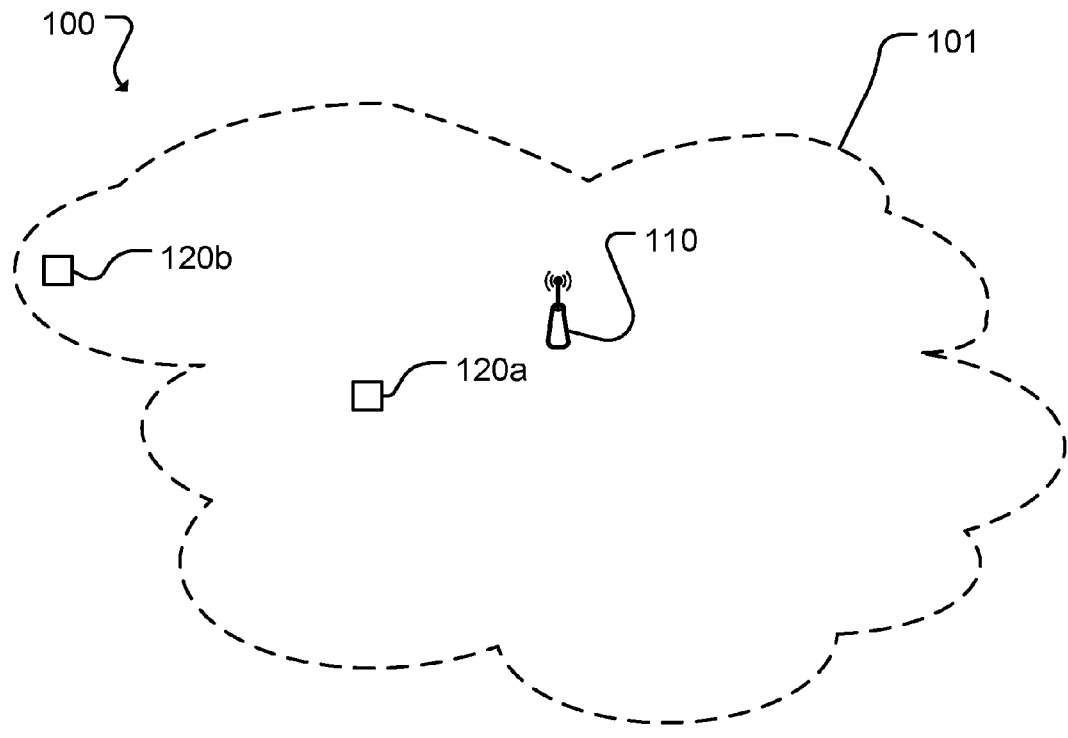
FIG. 1 illustrates a cell of a wireless network.
Figure 2:
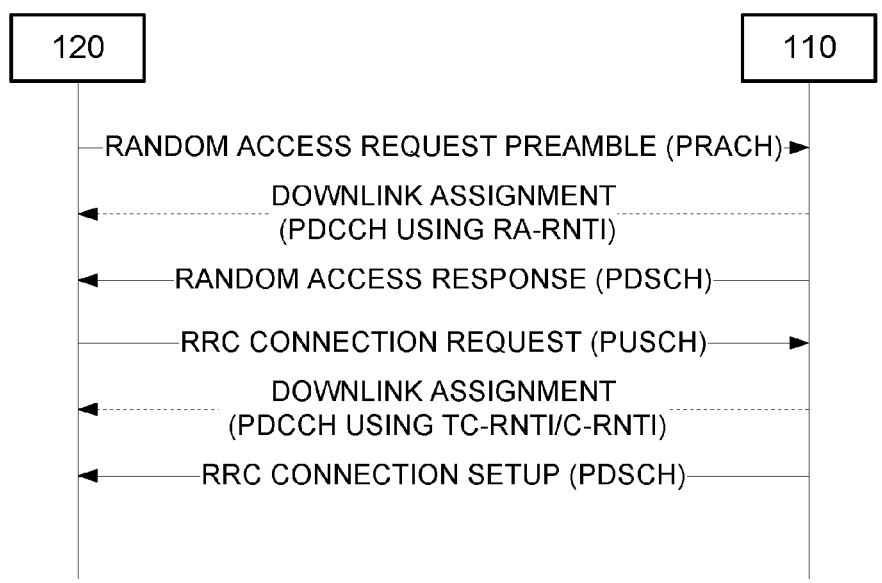
FIG. 2 illustrates the sequence of messages exchanged between a device and an eNodeB during a random access procedure.

After a random access attempt the wireless device 120 monitors the downlink for a response message, as described in relation to FIG. 2. According to one embodiment of the disclosure, resources for subsequent messages are selected based on the size of the random access resource. Subsequent messages are e.g. random access messages 2-4 as described in FIG. 2. For example, the robustness of the downlink message is dependent on the selected RACH resource where a longer RACH resource maps to a more robust response format. Robustness in the response message can be given by a larger allocation in time or frequency or by higher transmit power. The time/frequency resource as well as reference signal scrambling, reference signal overhead, and/or coding may also be dependent on the selected resource and/or preamble. According to one embodiment of the disclosure mapping from RACH resource is given as an equation dependent on RACH resource time duration and/or other parameters such as a signalled RACH resource selection parameter and/or additional signalled parameters. According to one embodiment of the disclosure, mapping is based on a table look-up or by other means.

It may be beneficial to keep the resource usage of the first response message limited since good link adaptation is difficult and only limited channel information is available. It could hence be beneficial to also correlate the robustness of the second uplink message, with the selected RACH resource. According to one embodiment of the disclosure adaptation is both in time and frequency resource for the transmission as well as applied coding rate and reference signal overhead. Also subsequent messages can follow a mapping scheme from the selected RACH resource in the robustness scheme before reconfiguration is possible.

Frequency Hopping

One benefit with extending the RACH resources in time is that coherent accumulation over multiple sub frames is possible. However due to frequency errors and/or channel variations there are time constraints for over how long time it is possible to do coherent accumulations.

Due to this constraint it is in some cases beneficial with frequency hopping in the random access resource. The frequency hopping pattern is either fixed in the standard or signalled in the system information. According to one embodiment of the disclosure the hopping patterns are different for different random access resource sizes and for different preambles.

According to one embodiment of the disclosure selection of resources is based on the wireless device's knowledge of channel variations and frequency error in order to select resources providing a good trade-off between coherent accumulation and frequency diversity.

System Information

As also mentioned above RACH configurations are notified to the users in the cell via system information blocks, SIBs). These new RACH configurations might be activated or configured within one cell upon detection of wireless devices being in need for this special operation mode. According to one aspect of the disclosure the method in a network node further comprises detecting 501 a wireless device 120 being in need of improved coverage. Several methods triggering this special operation might exist in the prior art. For example, the wireless network detects difficulties in communicating over the UL or the DL, and activating or deactivating the long range extension mechanisms based on the detection. The specific mode of operation may also be triggered based on prior knowledge that the position of a wireless device is a location in which the specific long range extension schemes are required for communications.

Upon detection of devices in the cell operating in this special mode, then these specific RACH configurations as the ones in FIG. 8a and FIG. 8b are be activated. According to one aspect of the disclosure, these RACH configurations are indicated in the respective SIBs, namely the modified SIB 2 or a SIB containing similar information.

In case the network has not detected any wireless devices being in need for this specific coverage enhancement mode, then the network has the option not to configure these specific coverage enhancement modes.

Otherwise, in this case in which no wireless devices in need of coverage enhancement features has been detected in the cell, the cell might broadcast these coverage enhancement specific RACH configurations for a limited period of time. This limited broadcasting can be done in a periodic manner. In this case, the network might easier detect wireless devices in need of these coverage enhancement features.

Turning now to FIG. 10 a schematic diagram illustrating some modules of an exemplary embodiment of the wireless device 120 will be described. A wireless device referred to in this application could be any user equipment capable of communicating with a mobile communication network. Examples of such devices are of course mobile phones, smartphones, laptops and Machine to Machine, M2M, devices etc. However, one must appreciate that capability to communicate with a multi-hop network could be built in almost any device e.g. a car, a lamp post, a scale and so on.

The wireless device 120 comprises a controller or a processor 121 that may be constituted by any suitable Central Processing Unit, CPU, microcontroller, Digital Signal Processor, DSP, etc., capable of executing computer program code. The computer program may be stored in a memory (MEM) 123. The memory 123 can be any combination of a Read And write Memory, RAM, and a Read Only Memory, ROM. The memory 123 may also comprise persistent storage, which, for example, can be any single one or combination of magnetic memory, optical memory, or solid state memory or even remotely mounted memory. The wireless device 120 further comprises a network communication unit or a communication interface 122 arranged for wireless communication with other devices or nodes, such as the wireless network node 110.

When the above-mentioned computer program code is run in the processor 121 of the wireless device 120 for selecting a random access resource for performing connection setup with the radio network node 110 according to an exemplary embodiment, it is caused to receiving information from a radio network node 110 indicating at least a first and a second random access resource being configured in the cell 101. The first and second random access resources have different resource sizes as described at the resource configuration section above.

After receiving the information the wireless device 120 will select one of said at least first and a second random access resources based on an expected uplink received power, as described at the resource selection section above.

The wireless device 120 will then transmit a random access message to said wireless network 100 using the selected resource.

Turning now to FIG. 11, a schematic diagram illustrating some modules of an exemplary embodiment of a radio network node 110 will be described. The radio network node 110 may be implemented as an Evolved Node B (eNB or eNodeB) in LTE, but may also be implemented in the radio access technology Global System for Mobile communications, GSM or Universal Mobile Telecommunications System or WiMax. The radio network node 110 comprises a controller (CTL) or a processor 111 that may be constituted by any suitable Central Processing Unit, CPU, microcontroller, Digital Signal Processor, DSP, etc., capable of executing computer program code. The computer program may be stored in a memory (MEM) 113. The memory 113 can be any combination of a Read And write Memory, RAM, and a Read Only Memory, ROM. The memory 113 may also comprise persistent storage, which, for example, can be any single one or combination of magnetic memory, optical memory, or solid state memory or even remotely mounted memory. The radio network node 110 further comprises a communication interface (i/f) 112 arranged for wireless communication with other devices or nodes, such as the wireless device 120.

When the above-mentioned computer program code is run in the processor 111 of the radio network node 110, it causes the radio network node 110 configure in a cell 101 of said wireless network 100 a first uplink radio resource as a first random access resource for use during a connection set up request. The radio network node 110 is furthermore configured to configure in the cell 101, at least one second uplink radio resource as a second random access resource. The first and second uplink radio resources have different resource sizes as further described in the resource configuration section.

The invention claimed is:

1. A method in a wireless device configured for operation in a wireless network, the method comprising the steps:
    receiving information from a radio network node comprised in a cell of the wireless network, wherein the received information indicates random access resources of different sizes configured for use in the cell of said wireless network;
    selecting, for use in transmitting a random access message for the radio network node, a smallest-sized one of said random access resources calculated to satisfy a target uplink received energy at the radio network node, in view of a transmit power limit of the wireless device and an estimate of path loss between the wireless device and the radio network node; and
    transmitting the random access message using the selected random access resource.

2. The method according to claim 1, wherein the random access message comprises a preamble.

3. The method according to claim 1, wherein the different sizes of random access resources have different sizes as measured according to at least one of: a time duration or repetition level, and a frequency bandwidth.

4. The method according to claim 1, wherein power control is applied with different power-control parameters for the different sizes of random access resources.

5. The method according to claim 1, wherein lower estimates of path loss tend to result in the selection of a smaller-sized random access resource, as compared to higher estimates of path loss.

6. The method according to claim 1, wherein said received information is contained in SystemInformationBlock.

7. The method according to claim 1, wherein said wireless network is a LTE network.

8. A non-transitory computer-readable medium storing a computer program that, when executed by processing circuitry of a wireless device configured for operation in a wireless network, configures the wireless device to:
    receive information from a radio network node comprised in a cell of the wireless network, wherein the received information indicates random access resources of different sizes configured for use in the cell of said wireless network;
    select, for use in transmitting a random access message for the radio network node, a smallest-sized one of said random access resources calculated to satisfy a target uplink received energy at the radio network node, in view of a transmit power limit of the wireless device and an estimate of path loss between the wireless device and the radio network node; and
    transmit the random access message using the selected random access resource.

9. A wireless device configured for operation in a wireless network and comprising:
    a network communication transceiver configured to communicate with a radio network node in a cell of said wireless network,
    a processor; and
    a memory storing computer program code which, when run in said processor, causes the wireless device to:
        receive information from said radio network node using said network communication transceiver, wherein the received information indicates random access resources of different sizes configured for use in the cell;
        select, for use in transmitting a random access message for the radio network node, a smallest-sized one of said random access resources that satisfies a target uplink received energy at the radio network node, in view of a transmit power limit of the wireless device and an estimate of path loss between the wireless device and the radio network node; and transmit the random access message using the selected random access resource.

10. A method performed in a radio network node in a wireless network, said method comprising the steps:

configuring random access resources of different sizes for use in a cell associated with the radio network node according to an arrangement whereby random access resources having dissimilar sizes do not overlap in time or frequency, the different sizes corresponding to different ranges of expected uplink received power at the radio network node; and transmitting configuration information indicating the random access resources, thereby enabling one or more wireless devices operating in the cell to transmit random access messages for the radio network node using selected ones of the random access resources.

11. The method according to claim 10, further comprising indicating, to the one or more wireless devices, rules applicable when selecting from among the random access resources, for attempting random access to the radio network node.

12. The method according to claim 10, wherein the random access resources include at least first and second random access resources having different time durations or repetition levels.

13. The method according to claim 10, wherein the random access resources include at least first and second random access resources having different frequency bandwidths.

14. The method according to claim 10, wherein the random access resources include at least first and second random access resources having similar sizes and having overlapping time and frequency resources, said first second random access resources being separated in a code domain.

15. The method according to claim 10, wherein said radio network node is an eNodeB in a LTE network.

16. A non-transitory computer-readable medium storing a computer program comprising program instructions that, when executed by processing circuitry of a radio network node configured for operation in a wireless network, configure the radio network node to:

configure random access resources of different sizes for use in a cell associated with the radio network node according to an arrangement whereby random access resources having dissimilar sizes do not overlap in time or frequency, the different sizes corresponding to different ranges of expected uplink received power at the radio network node; and transmit configuration information indicating the random access resources, thereby enabling one or more wireless devices operating in the cell to transmit random access messages for the radio network node using selected ones of the random access resources.

17. A radio network node configured for operation in a cell of a wireless network, said radio network node comprising:

a processor; and a memory storing computer program code which, when run in the processor, causes the radio network node to:

configure random access resources of different sizes for use in a cell associated with the radio network node according to an arrangement whereby random access resources having dissimilar sizes do not overlap in time or frequency, the different sizes corresponding to different ranges of expected uplink received power at the radio network node; and transmit configuration information indicating the random access resources, thereby enabling one or more wireless devices operating in the cell to transmit random access messages for the radio network node using selected ones of the random access resources.

18. A method at a wireless device configured for operation in a wireless network, the method comprising:

with respect to two or more differently-sized random access resources configured for use in attempting random access towards a radio network node of the wireless network, selecting the smallest-sized one of the two or more random access resources that is calculated to satisfy a target uplink received energy at the radio network node, in view of a transmit power limit of the wireless device and an estimate of path loss between the wireless device and the radio network node; and transmitting a random access message using the selected random access resource.

* * * * *